UNITED STATES PATENT OFFICE.

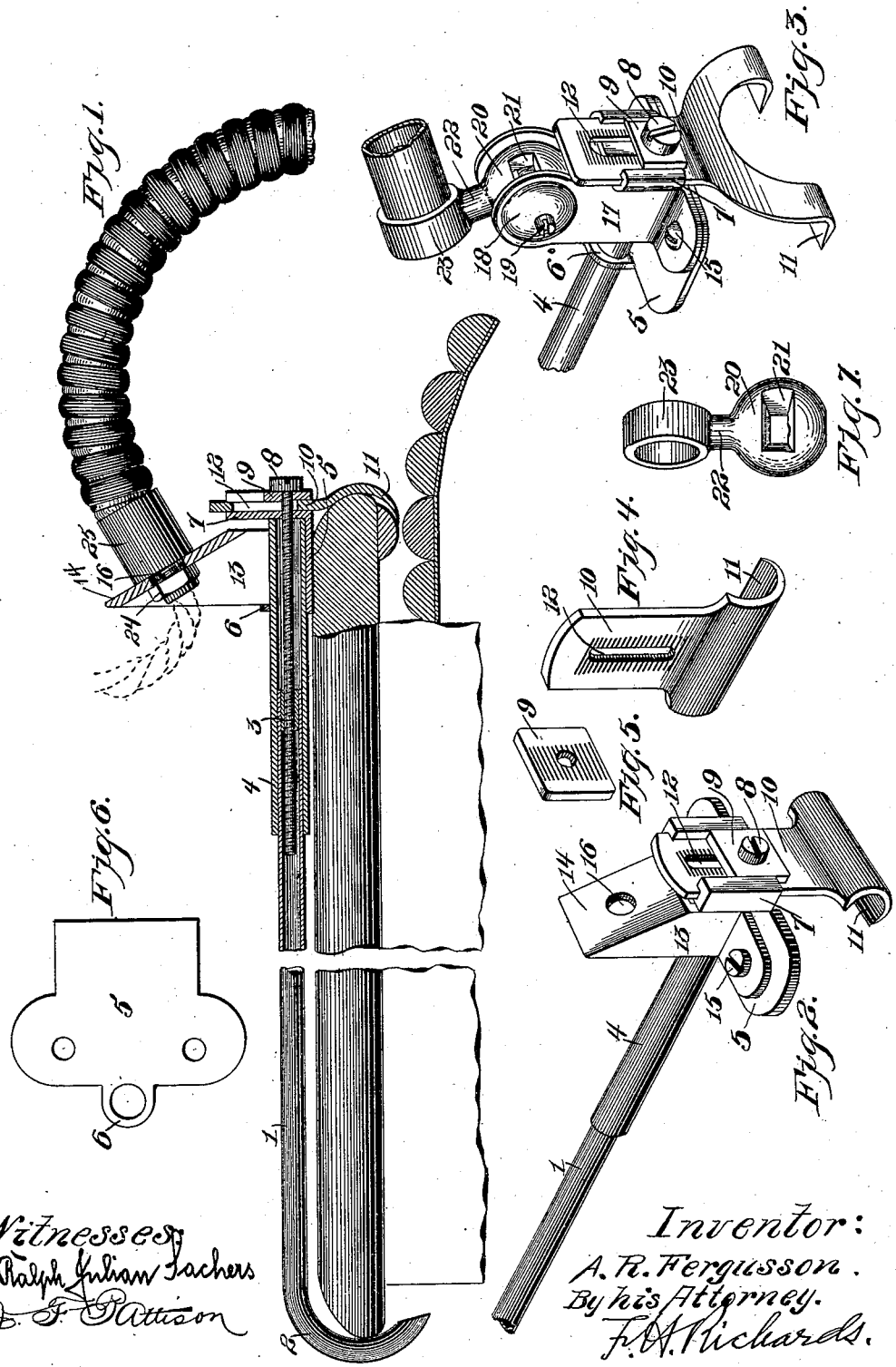

ALAN ROBB FERGUSSON, OF MOUNT VERNON, NEW YORK, ASSIGNOR TO ELECTRO-MECHANICAL SPECIALTY COMPANY, OF NEW YORK, N. Y., A CORPORATION OF NEW YORK.

DESK-CLAMP.

SPECIFICATION forming part of Letters Patent No. 722,828, dated March 17, 1903.

Application filed August 29, 1902. Serial No. 121,420. (No model.)

*To all whom it may concern:*

Be it known that I, ALAN ROBB FERGUSSON, a citizen of the United States, residing in Mount Vernon, in the county of Westchester and State of New York, have invented certain new and useful Improvements in Desk-Clamps, of which the following is a specification.

This invention relates to the mounting of supporting-brackets for electrical translating devices upon office-desk tops of varying widths and thickness.

One object of the invention is to provide a simple and reliable clamp which may readily be adjusted to different widths and thicknesses of desk-tops, and another object is to provide such staff-supporting means which will allow of using a relatively short staff, but still capable of being bent or adjusted far down upon the desk, so as to use, for instance, a light to its utmost advantage.

The nature of the invention consists in the construction and arrangements hereinafter set forth, which may be applied with special advantage to brackets, such as described and claimed in several of my prior patent applications—as, for instance, Serial No. 94,000, filed February 14, 1902, and Serial No. 86,486, filed December 19, 1901.

The accompanying drawings, forming part of the present application, illustrate the invention in its preferred form.

Figure 1 is a side view, partly in section, of the assembled device; Fig. 2, a perspective side view of the front part of the same; Fig. 3, a similar view of a modified form; Fig. 4, a perspective view of the adjustable clamp; Fig. 5, a perspective side view of a washer; Fig. 6, a plan view of a blank for the supporting-base, and Fig. 7 a perspective side view of a member of a universal joint for supporting a bracket-staff.

1 in Fig. 1 is a rear member of a plurality of telescopic clamping members having an integral claw 2 for embracing the rear edge of a desk-top. The front end of said member 1 is provided with an internal screw thread or nut 3.

4 is a tubular clamping member, which, with its forward end, is preferably riveted into a bent-up tongue 7 of a base-plate 5 and which passes through a bent-up ring or collar 6 of the same plate. The bent-up tongue 7 of the base-plate 5 shows lips for guiding the up-and-down adjustable shank 10 of the forward clamp 11. A screw 8 passes through a washer 9, located between the aforementioned lips of the base-plate 5 and through the slot 12 of the shank 10 into the tubular member 4 and finally into the nut 3 of the member 1. The front side of the adjustable clamp 11 and the rear side of the washer 9 are corrugated and roughened, and by operating the screw 8 not only the telescopic members 1 and 4 will be drawn together, but also the adjustable clamp 11 will be maintained in any desired position.

The great advantage of having only one device—*i. e.*, the screw 8—for maintaining the proper adjustment of the desk-clamp in relation to the width and also the thickness of the desk-top will be immediately apparent.

Fig. 2 illustrates one form of the supporting means, consisting of side plates 13 and an inclined supporting-plate 14, having a threaded hole or perforation 16. Screws 15 secure these supporting means to the base-plate 5.

In Fig. 1 a nipple 25 is shown, which is rigidly connected to the inclined plate 14 and held thereon and in the threaded hole 16 by a screw-nut 24.

In Fig. 3 the side plates 17 of the support are secured to the base 5 by screws 15; but their upper ends are formed into hollow sockets 18 for surrounding and holding the ball 20 of a universal joint. Screws 19 are held in these sockets 18 and enter into recesses 21 of the ball 20 for the purpose of limiting the swinging movement of the bracket, which is connected to the ball by the shank 22 and the collar 23.

Stiff or flexible staffs may be used in connection with the present clamp, and great advantages will be derived from the employment of the clamp, which is intended to be fully protected by the following claims.

I claim—

1. In a desk-clamp, the combination with oppositely-disposed claws for catching over the front and rear edges of the desk-top, of means for drawing said claws toward each other, and of means for adjusting one of said claws at right angles to the desk-top.

2. A desk-clamp comprising two members, a claw provided upon one of said members, means for adjusting said members toward or away from each other, staff-supporting means upon the other of said members, and a claw adjustable upon the last-mentioned member at right angles to the direction of adjustment of said members.

3. A desk-clamp comprising forward and rear members, a claw upon the rear member, staff-carrying means upon the front member, a claw upon said front member and adjustable at right angles to the two members, and a screw for drawing together said members and maintaining the up-and-down adjustment of said front claw.

4. A desk-clamp comprising forward and rear members, a claw upon the rear member, staff-carrying means upon the front member, a perforated seat upon said front member, a slotted claw adjustable upon said seat, a screw extending through the slot in said claw and also through the perforation in said seat and engaging said rear member, and a washer between said front claw and the head of said screw.

5. A desk-clamp comprising forward and rear members, a claw upon the rear member, staff-carrying means upon the front member, a perforated seat upon said front member, a slotted claw adjustable upon said seat, a screw extending through the slot in said claw and also through the perforation in said seat and engaging said rear member, and washer between said front claw and the head of the screw said washer and said front claw being corrugated.

6. A desk-clamp comprising forward and rear members, a claw upon the rear member, staff-carrying means upon the front member, a perforated seat upon said front member, a slotted claw adjustable upon said seat, a screw extending through the slot in said claw and also through the perforation in said seat and engaging said rear member, and a washer between said claw and the head of said screw, said washer and said claw being corrugated and said seat having means engaging said claw and said washer so as to prevent turning thereof.

7. The combination of rear and forward telescopic members, a claw upon said rear member, a plate to which the forward member is attached, staff-supporting means carried by said plate, inwardly-bent lips upon the side of said plate, a claw having a slotted shank which is confined by said lips, a screw extending through the slot in said shank and engaging the rear telescopic member, and a washer placed between said shank and the head of said screw, said shank and said washer having rough contacting surfaces and said washer being confined by the edges of the lips.

8. The combination of rear and forward telescopic members, a claw upon said rear member, a plate to which said forward member is attached, a bracket fixed upon said plate, staff-supporting means upon said bracket, a claw having a shank adjustable upon a seat provided upon said plate, and a screw for simultaneously securing said claw and drawing together said telescopic members.

9. The combination of two telescopic members, of which the rear member has a claw and the forward member has an up-and-down adjustable claw and also staff-supporting means, and means for simultaneously securing said adjustable claw and drawing together said telescopic members.

10. The combination with telescopic members, of a base-plate, and of staff-supporting means, comprising a ball-and-socket joint and means located in the socket for limiting the movement of the ball.

11. The combination with telescopic members, of a base-plate, and of staff-supporting means comprising a ball-and-socket joint, a recess in said ball and screws in said socket and entering said recess for limiting the movement of said ball.

In testimony whereof I have hereunto set my hand, in the presence of two subscribing witnesses, this 27th day of August, 1902.

ALAN ROBB FERGUSSON.

In presence of—
RALPH JULIAN SACHERS,
MARCUS C. HOPKINS.